I. S. Reeves.
Fare Box.

No. 517. Reissued Aug. 3, 1858.

N. PETERS, PHOTO-LITHOGRAPHER, WASHINGTON, D. C.

UNITED STATES PATENT OFFICE.

ISRAEL S. REEVES, OF NEW ORLEANS, LOUISIANA, ASSIGNOR TO J. B. SLAWSON.

IMPROVED OMNIBUS FARE-BOX.

Specification forming part of Letters Patent No. 19,471, dated February 23, 1858; Reissue No. 577, dated August 3, 1858.

*To all whom it may concern:*

Be it known that I, ISRAEL S. REEVES, of New Orleans, in the parish of Orleans and State of Louisiana, have made a new and useful improvement in boxes in which passengers deposit their fare in omnibuses and other public conveyances; and I do hereby declare the following to be a full and exact description thereof, reference being had to the accompanying drawing and to the letters of reference marked thereon.

The same letters are used in designating the same parts in the different figures.

My improvement relates to that class of fare-boxes intended for the protection of omnibuses, steamboat, and railroad proprietors against fraud on the part of drivers, clerks or conductors, and passengers, which are so constructed and arranged that the fare before dropping into the money-drawer for the reception of all the fare (and which for this purpose is so secured as to be inaccessible to all save the party duly authorized to open them) shall be first arrested into a compartment having glass sides so arranged that the fare can be scrutinized as well by the driver, &c., as the passengers, so that both may see whether the full amount of the fare has been deposited in genuine money. The object of my improvement is to simplify their construction so as to render them less cumbersome and costly, and the better to insure the deposition of the fare into the box or money-drawer below when it has been thoroughly scrutinized.

To enable others skilled in the art to make, construct, and use my improvement, I will now proceed to describe it in detail.

Figure 2:
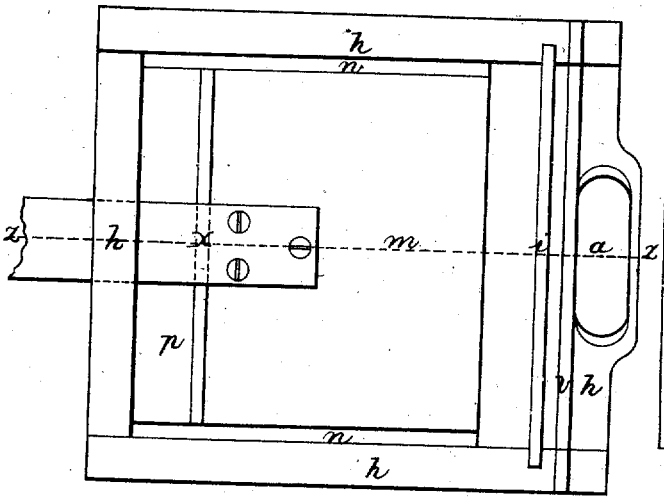
Figure 3:
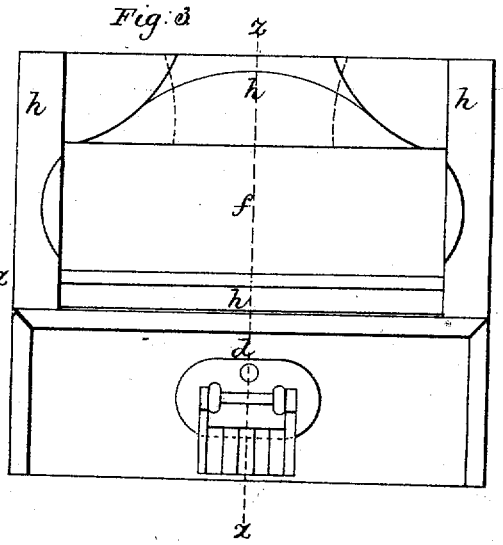
Figure 1:
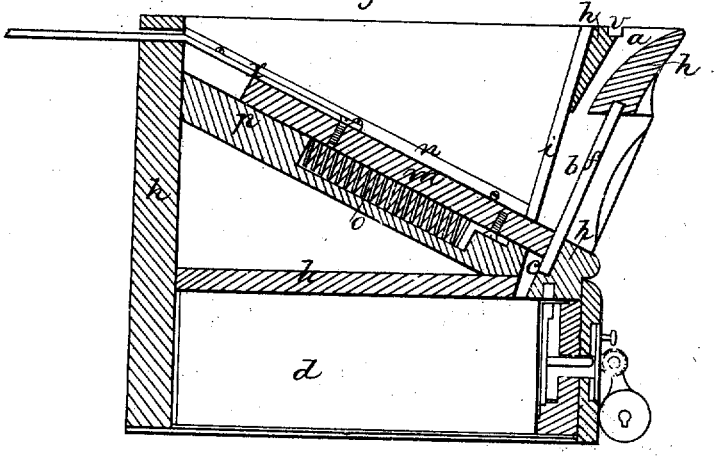

In the accompanying drawings, Figure 1 represents a vertical longitudinal section taken through the middle of a fare-box constructed on my improved plan; Fig. 2, a plan of the same, and Fig. 3 a front elevation.

The frame *h* of the box consists of two sides dovetailed into or otherwise secured to an end piece, —, their forward ends being connected together by means of a horizontal bar, —, arranged at such distance from the under side of the box as to leave sufficient space between it and the bottom piece of the box for the reception of the drawer *d* provided for the receiving of the money. Over this drawer a diaphragm, —, is arranged and securely attached to the sides of the box, a small space, *e*, being left between its front side and the connecting-piece —, through which the money passes into the drawer *d* below. Over this diphragm an inclined block, P, is arranged and properly secured to the sides of the box, with the exception of the front side, which merely extends forward sufficiently far to form a portion of the side of the opening. This block is set in in such manner as to present an inclined plane, over which is arranged a sliding table or apron, *m*, to the under side of which is attached one end of a spring, the other end of which is secured to the inclined block P. This spring plays in a groove, —, formed for its reception in the block P in such manner that when the sliding table or apron is drawn back to open the passage to the drawer underneath and the force withdrawn that retains it in that position it will be forced back against the connecting-piece —, and thus close the passage *e* to the money-drawer. The ledges *n*, with which the sides — are provided, serve to guide and keep the sliding table in its proper relative position. The two sides of the box are made to extend farther to the front at their upper than at their lower end, and are braced together by a top connectin-gpiece, —, provided with a mouth or orifice, *a*, at or near its middle, through which the money or fare is deposited in the box. In the space between the two sides — and the two connecting-pieces — a glass plate, F, is inserted, another similar one, *i*, being arranged at a short distance from it in its rear in such manner as to form a channel or narrow chamber for the temporary arrest of the fare as it is dropped into this chamber through the mouth *a*. The second glass plate, *i*, extends down close to the sliding table *m*, so as to prevent the money from slipping out underneath.

In arranging the glass sides they may either be arranged in a line parallel with each other, or narrow at the top and wide at the bottom, or narrow at the bottom and wide at the top, to each of which there are peculiar advantages; but it is deemed better to make the chamber wider at the bottom than the top, as by making it so it is less liable to choke up when a number of copper coins are deposited in payment of the fare. When the passenger has deposited his fare through the mouth *a*, it drops down into the channel or chamber *b* formed by the two glass plates *i* and *f*, and is arrested by the sliding table *n* to enable the driver as well as the passenger to examine whether the amount paid in is correct, after which the driver by pulling a strap, —, which is attached to the rear end of the sliding table, draws the latter back, thereby opening the passage and allowing the fare to drop through into the drawer beneath. The moment that the force exerted on the strap is released the spring *s* forces the sliding table *m* back against the connecting-piece —, thereby closing the passage to the drawer.

Various other modes of operating the apron or slide could here be enumerated; but the foregoing is deemed sufficient, as in practice it has been found to operate well.

Having thus described my invention, what I claim as new, and desire to secure by Letters Patent, is—

1. The glass plates *i* and *f* as arranged in connection with the apron *m*, in the manner substantially as and for the purposes set forth.

2. Closing the passage to the drawer below from the chamber above by means of an apron operated by a spring, *s*, in the manner substantially as set forth.

In testimony whereof I hereunto set my hand to this specification.

Witnesses: I. S. REEVES.

ROBT. M. LUSHER,
CHAS. A. NATILI.